United States Patent Office 3,428,686
Patented Feb. 18, 1969

3,428,686
METHOD FOR PRODUCING ACROLEIN AND METHACROLEIN
Charles L. Thomas, Swarthmore, Pa., assignor to Sun Oil Company, Philadelphia, Pa., a corporation of New Jersey
No Drawing. Filed Aug. 31, 1967, Ser. No. 664,625
U.S. Cl. 260—604
Int. Cl. C07c 45/04
4 Claims

ABSTRACT OF THE DISCLOSURE

Acrolein and methacrolein are prepared by reacting propylene and isobutylene respectively with air or oxygen in the presence of a platinum catalyst which is in the form of a metallic gauze at temperatures of from 750°–1000° C. for contact times of less than 0.1 second.

BACKGROUND OF THE INVENTION

This invention relates to an improved process for the preparation of unsaturated aldehydes, and particularly acrolein and methacrolein, by the high temperature oxidation of olefins in the presence of a platinum catalyst which is in the form of a metallic gauze.

Several methods are known for the oxidation of olefins to form unsaturated aldehydes using catalysts at elevated temperatures. Thus, for example, U.S. Patent 3,080,425 discloses a method for oxidizing olefins to form aldehydes and ketones using an aqueous solution of a platinum salt as a catalyst together with an oxidizing agent, at temperatures of from 0° C. to 200° C.

U.S. Patent 3,215,743 teaches the oxidation of olefins to aldehydes and ketones in the presence of an aqueous solution of a platinum salt and a salt having several valence states, i.e. a redox system.

U.S. Patent 3,104,263 likewise teaches the oxidation of ethylene to form acetaldehyde in the presence of an aqueous solution of a catalyst comprising an inorganic redox system. An oxidizing agent must also be employed, and the reaction must be carried out under pressure.

In each of the foregoing methods it will be noted that the reaction is carried out under aqueous conditions, thus requiring costly and complex equipment which nevertheless limits the amount of reactants which could be used practically at any one time. Moreover, the catalyst systems are complex in nature and generally requires the use of additional components such as oxidizing agents.

Air oxidation and vapor phase oxidation of olefins to form aldehydes and ketones are also taught by the prior art. For example, U.S. Patent 3,171,859 relates to a process for preparing unsaturated aldehydes by the air oxidation of olefins using a complex catalyst containing bismuth oxide and molybdenum oxide. The catalyst, however, must be used in conjunction with a carrier in the form of a bed; moreover, it is necessary to supply steam or other diluents to the reaction.

Similarly, U.S. Patent 3,271,459 provides a high temperature process for the conversion of propylene and isobutylene to acrolein and methacrolein employing a silver base catalyst deposited on an inert carrier. Again, however, steam or other diluents must be supplied to the reactor.

Thus, in each of the above two patents, a complex system of catalyst pellets arranged in the form of a fixed or fluidized bed, together with the necessary apparatus, heating means is employed which requires that the feed has to be pre-heated to nearly reaction temperature, and then that the heat of reaction be removed, usually by cooling the external walls of the reactor. Moreover, it is essential that the reactors be shut down from time to time in order that the catalysts may be regenerated.

It is, therefore, an object of this invention to provide an improved process for preparing unsaturated aldehydes from olefins, utilizing a catalyst system which will avoid each of the aforementioned disadvantages inherent in these prior art methods. More particularly, it is an object of this invention to provide a process for the preparation of acrolein and methacrolein wherein there is employed a self-sustaining oxidation reaction, using a simple metal catalyst which does not require regeneration, yet which permits the use of extremely high space velocities of feed input together with contact times as low as 0.0001 second.

SUMMARY OF THE INVENTION

In accordance with the present invention, it has now been found that unsaturated aldehydes may be prepared by passing a mixture of an olefin and oxygen or air over a platinum catalyst which is in the form of a metallic gauze at temperatures of from about 750° C. to 1000° C. for contact times of less than 0.1 second. The reaction products can then be readily recovered by quenching them immediately down stream of the catalyst gauze by injecting a suitable coolant, followed by distillation of the resulting mixture.

DESCRIPTION OF THE PREFERRED EMBODIMENTS

In carrying out the process of this invention, a variety of reactors may be employed. One such type of reactor which may be adapted for use in the instant process is described in Kirk-Othmer's "Encyclopedia of Chemical Technology," vol. 9 (1952), at p. 334, where a horizontally disposed converter is provided inside with horizontal layers of platinum gauze which can be electrically heated. Suitable means for introducing and mixing the olefins and air or oxygen, and conventional quenching means may be readily provided using devices known to those skilled in the art.

The catalyst, which is preferably platinum, or a 90:10 mixture by weight of platinum and rhodium, in the form of layers of metallic gauze, or screen, is equipped with heating elements for starting the reaction. The layers generally total anywhere from about five to twenty in number, and may be placed about 0.01 inch apart. The average mesh size of the platinum gauze is about 80–100 mesh. It should be noted that applicant's process, utilizing this type of catalyst is particularly advantageous in that it is in a convenient form for handling and placing in the reactor as contrasted with pelletized catalysts which must be arranged in the form of beds and the like. Also, this process is especially advantageous in that the reaction may proceed for several days without interruption inasmuch as conventional catalyst regeneration is unnecessary.

To start the reaction the gauze is first heated electrically to reaction temperature and the mixture of olefin and air or oxygen is then supplied to the reactor. Thereafter, the exothermic reaction on the surface of the gauze provides sufficient heat to keep the catalyst at reaction temperature, so that the electricity may be turned off. It is thus a particular advantage of this process that aside from the initial heating of the catalyst gauze, no additional external heat need be supplied to the reactor. Instead, the reaction is self-sustaining, and no added heating or cooling of the reactor is necessary. However, if desired, the feed may be preheated by recycling the hot products through an appropriate heat exchanger.

The products are then readily recovered by quenching the reactor effluent immediately downstream of the catalyst gauze or heat exchanger by the injection of a suitable coolant such as water or the olefin starting material itself. The acrolein or methacrolein product may then be recovered from the coolant by distillation.

The olefins employed in the process of this invention are those containing three to four carbon atoms, i.e. propylene and isobutylene, from which are obtained, respectively, acrolein and methacrolein.

The molecular ratio of olefin to oxygen may be varied over limits ranging from 1:1 to 4:1 and preferably should be from 2:1 to 3:1. It is essential that at least one part oxygen or air per three to five parts of olefin be employed inasmuch as at lower ratios there will not be sufficient oxygen present to provide enough heat to maintain a self-sustaining oxidation reaction. Moreover, when the ratio of olefin to oxygen drops below about 1:1, there is produced increasing amounts of carbon monoxide and water. It will be understood, of course, that air may be used instead of pure oxygen.

The reaction temperatures employed are desirably in the range of from about 750°–1000° C., and preferably are from 800° to 900° C., while the contact time of the feed with catalyst is generally less than 0.1 second, and may be as low as 0.0001 second. The process is generally operated at atmospheric pressure, but pressures ranging from five atmospheres to fifty mm. of mercury may be employed if desired.

The extremely fast reaction rate resulting from the combination of the high temperatures and short contact times described above, together with the use of a metallic gauze catalyst, makes it possible to obtain very high space velocities in carrying out this process, and, therefore, higher yields. By space velocities is meant the relationship of volumes of gas per volume of catalyst per hour. Thus, for example, space velocities in the range of from 5,000 to 10,000 volumes are possible when utilizing optimum operating conditions.

The following examples are included to further illustrate the present invention.

Example 1

A reactor is provided with a catalyst consisting of 90 parts by weight of platinum and 10 parts by weight of rhodium. The catalyst is in the form of 100-mesh gauze made from wire 0.003 inch in diameter, and is horizontally disposed in the reactor in five layers spread 0.01 inch apart. The catalyst is heated electrically to 950° C., and a feed comprising three volumes of propylene and one volume of oxygen is introduced into one end of the reactor, each through one arm of a Y-shaped tube placed upstream from the gauze in order to provide mixing of the two gases. The gaseous mixture, which has been preheated to 500° C., is passed over the catalyst at a linear velocity of five feet per second for a contact time of 0.001 of a second. The electricity is turned off, and the self-sustaining reaction is continued in the presence of the glowing gauze catalyst for ten days. The effluent gases are rapidly quenched with propylene, and the acrolein recovered by absorption and distillation. Small amounts of catechol are added to the acrolein to inhibit its polymerization. The unreacted and the quench propylene are recycled.

Example 2

Two volumes of isobutylene and five volumes of air are charged to the reactor described in Example 1. The catalyst is heated electrically to a temperature of 850° C., and after the reaction has been initiated, it is turned off. The feed is passed over the glowing catalyst at a linear velocity of six feet per second for a period of five days. The effluent gases are quenched with steam, methacrolein is recovered from the resulting solution by distillation, and the unreacted isobutylene is recycled to the reactor.

Example 3

Repeating the process of Example 1, but utilizing a feed consisting of 97% by volume of propylene and 3% oxygen, it is found that as soon as the electricity to the catalyst gauze is turned off, the gauze stops glowing and the reaction stops.

What is claimed is:

1. A process for the preparation of acrolein which comprises contacting a mixture comprising propylene and oxygen with a platinum catalyst in the form of a metallic gauze at a temperature of about 750°–1000° C. for a contact time of between about 0.0001 second and 0.1 second, wherein the ratio of propylene to oxygen is from about 4:1 to 1:1.

2. A process for the preparation of methacrolein which comprises contacting a mixture comprising isobutylene and oxygen with a platinum catalyst in the form of a metallic gauze at a temperature of about 750°–1000° C. for a contact time of between about 0.0001 second and 0.1 second, wherein the ratio of oxygen to isobutylene is from about 3:1 to 1:1.

3. The process according to claim 1 wherein the catalyst is a 90:10 mixture by weight of platinum and rhodium.

4. The process according to claim 2 wherein the catalyst is a 90:10 mixture by weight of platinum and rhodium.

References Cited

Patterson et al.: Chemical Abstracts, vol. 60 col. 6254–6255, 1964.

BERNARD HELFIN, *Primary Examiner.*

R. H. LILES, *Assistant Examiner.*

U.S. Cl. X.R.

252—472